(12) United States Patent
Payne

(10) Patent No.: US 8,534,592 B2
(45) Date of Patent: Sep. 17, 2013

(54) APPARATUS AND METHOD FOR APPLYING A TARP TO TRUCKING CARGO

(76) Inventor: Fred V. Payne, St. Augustine, FL (US)

( * ) Notice: Subject to any disclaimer, the term of this patent is extended or adjusted under 35 U.S.C. 154(b) by 442 days.

(21) Appl. No.: 12/828,680

(22) Filed: Jul. 1, 2010

(65) Prior Publication Data

US 2012/0001010 A1    Jan. 5, 2012

(51) Int. Cl.
*B65H 16/02*    (2006.01)
*B60J 11/00*    (2006.01)

(52) U.S. Cl.
USPC .......................................... 242/557; 296/96

(58) Field of Classification Search
USPC .................. 242/403, 533.8, 557, 598, 598.5; 296/98
See application file for complete search history.

(56) References Cited

U.S. PATENT DOCUMENTS

| | | | |
|---|---|---|---|
| 3,223,350 A * | 12/1965 | Bock et al. | 242/566 |
| 4,084,763 A * | 4/1978 | Zamboni | 242/393 |
| 4,573,846 A * | 3/1986 | Willbanks et al. | 242/557 |
| 5,713,712 A | 2/1998 | McIntyre | |
| 5,878,474 A * | 3/1999 | Yasnogorodskiy et al. | 29/431 |
| 5,956,923 A * | 9/1999 | Andros et al. | 242/557 |
| 5,964,236 A | 10/1999 | Berke | |
| 6,502,709 B1 | 1/2003 | Parker | |
| 6,634,850 B2 | 10/2003 | Christensen | |
| 6,695,382 B2 | 2/2004 | Ciferri et al. | |
| 6,811,202 B2 | 11/2004 | Hornady | |
| 7,182,387 B2 | 2/2007 | Hartman | |
| 7,496,983 B2 * | 3/2009 | Kostigian | 242/557 |
| 8,215,577 B2 * | 7/2012 | Gordon et al. | 242/403 |
| 2002/0043816 A1 | 4/2002 | Johnston | |
| 2004/0144881 A1 * | 7/2004 | Whyte et al. | 242/557 |
| 2004/0239142 A1 | 12/2004 | Poyntz | |
| 2008/0135669 A1 * | 6/2008 | Kostigian | 242/557 |
| 2012/0187232 A1 * | 7/2012 | Molen | 242/557 |

* cited by examiner

*Primary Examiner* — William A Rivera
(74) *Attorney, Agent, or Firm* — The Bilicki Law Firm, P.C.; Byron A. Bilicki; Rebecca M K Tapscott

(57) ABSTRACT

An apparatus and method for applying a tarping material to trucking cargo are provided. The tarping material may be formed into a roll with a rod disposed therethrough. The roll may be supported by a frame. The roll can be configured to move vertically with respect to the ground. A trailer carrying trucking cargo can be stationed beneath the frame. The tarping material may be unwound and dispensed from the roll. In order to drape the trucking cargo with the tarping material, the roll may be moved horizontally over the frame in addition to or alternatively to having the trucking cargo driven horizontally with respect to the roll.

17 Claims, 13 Drawing Sheets

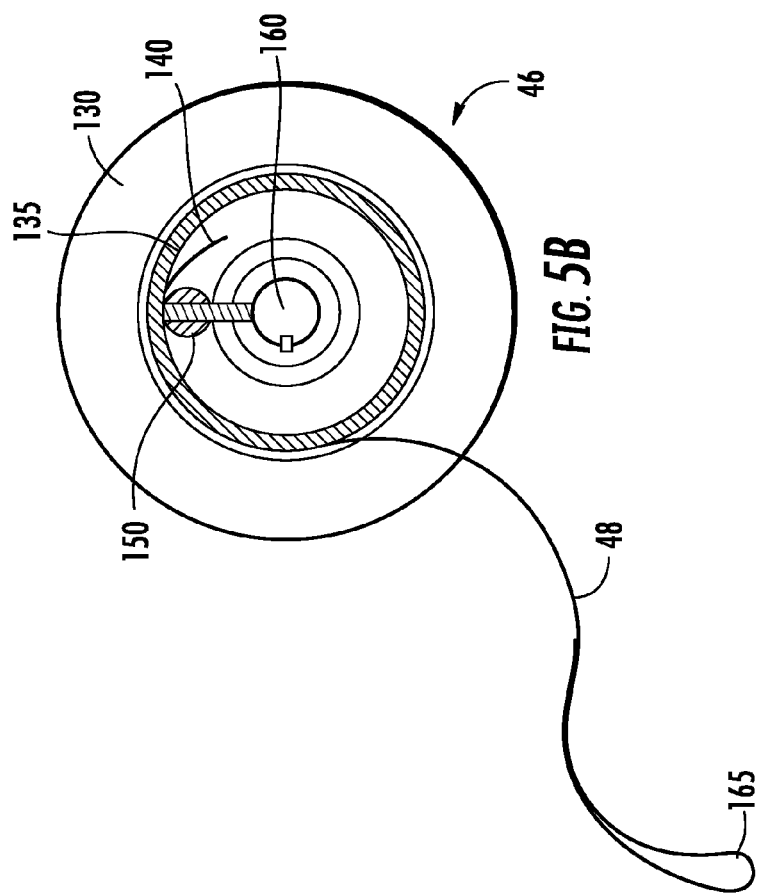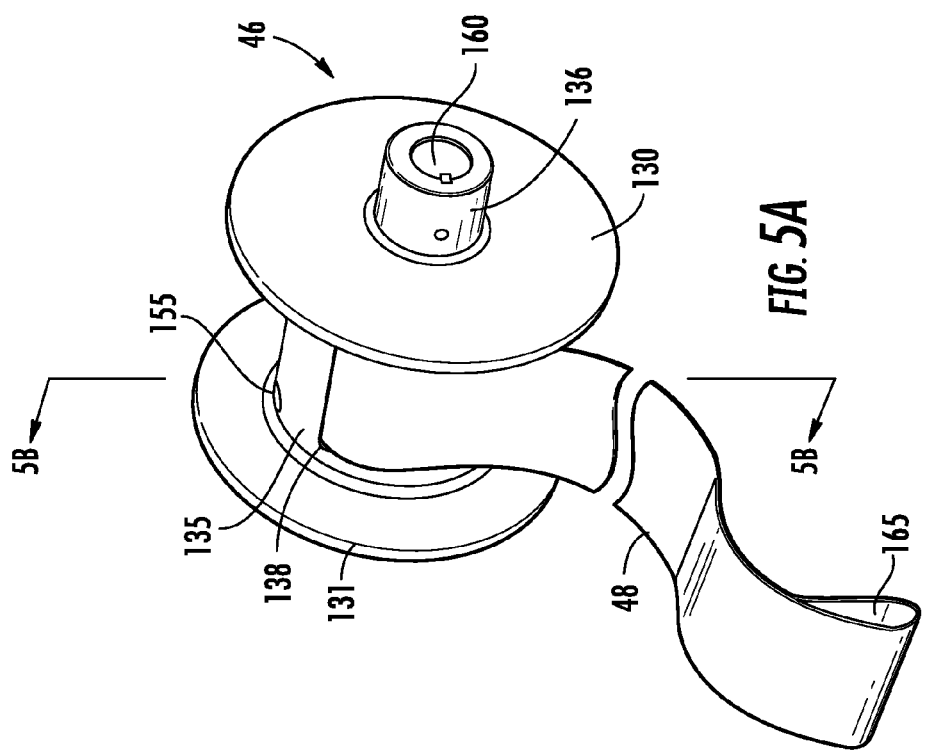

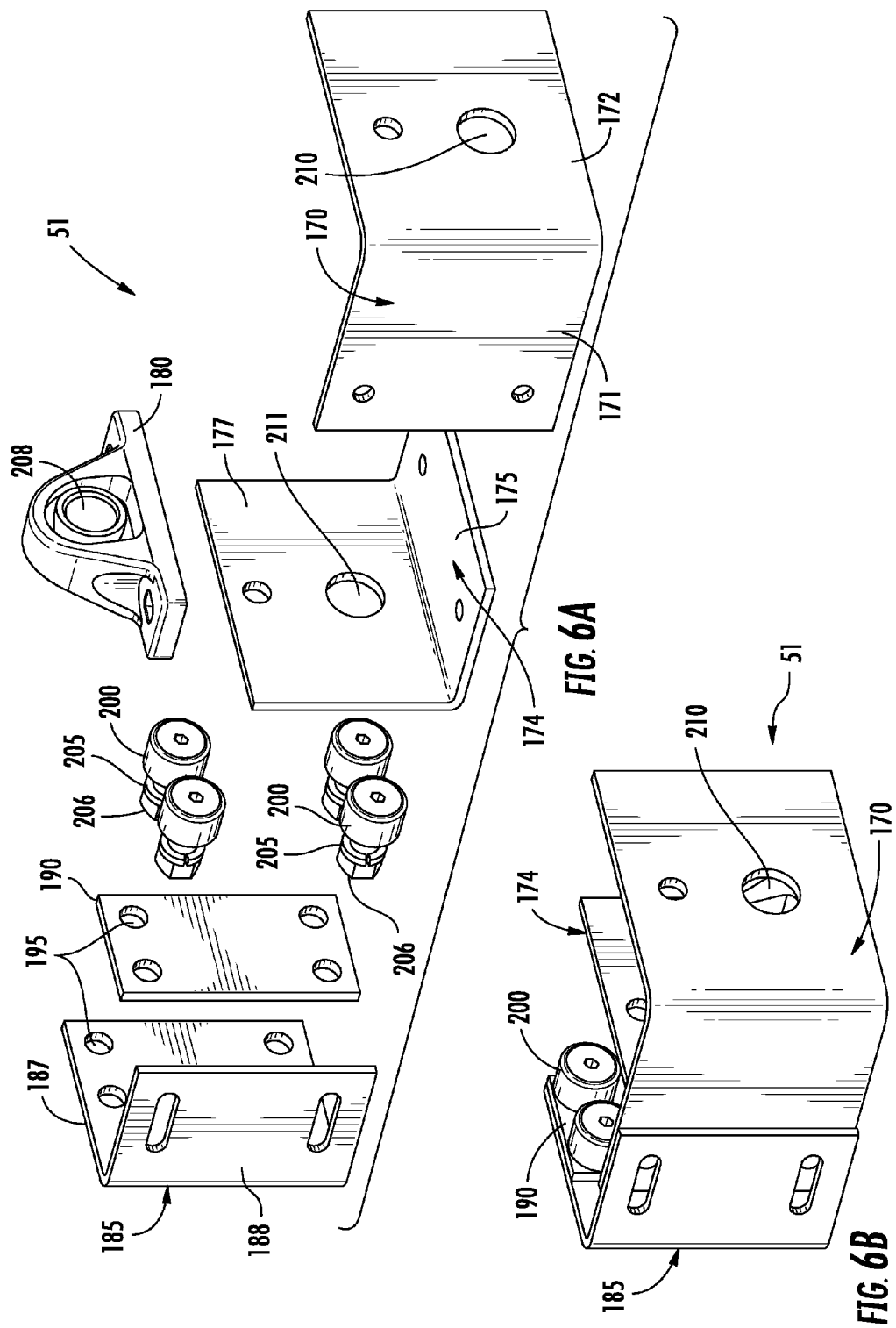

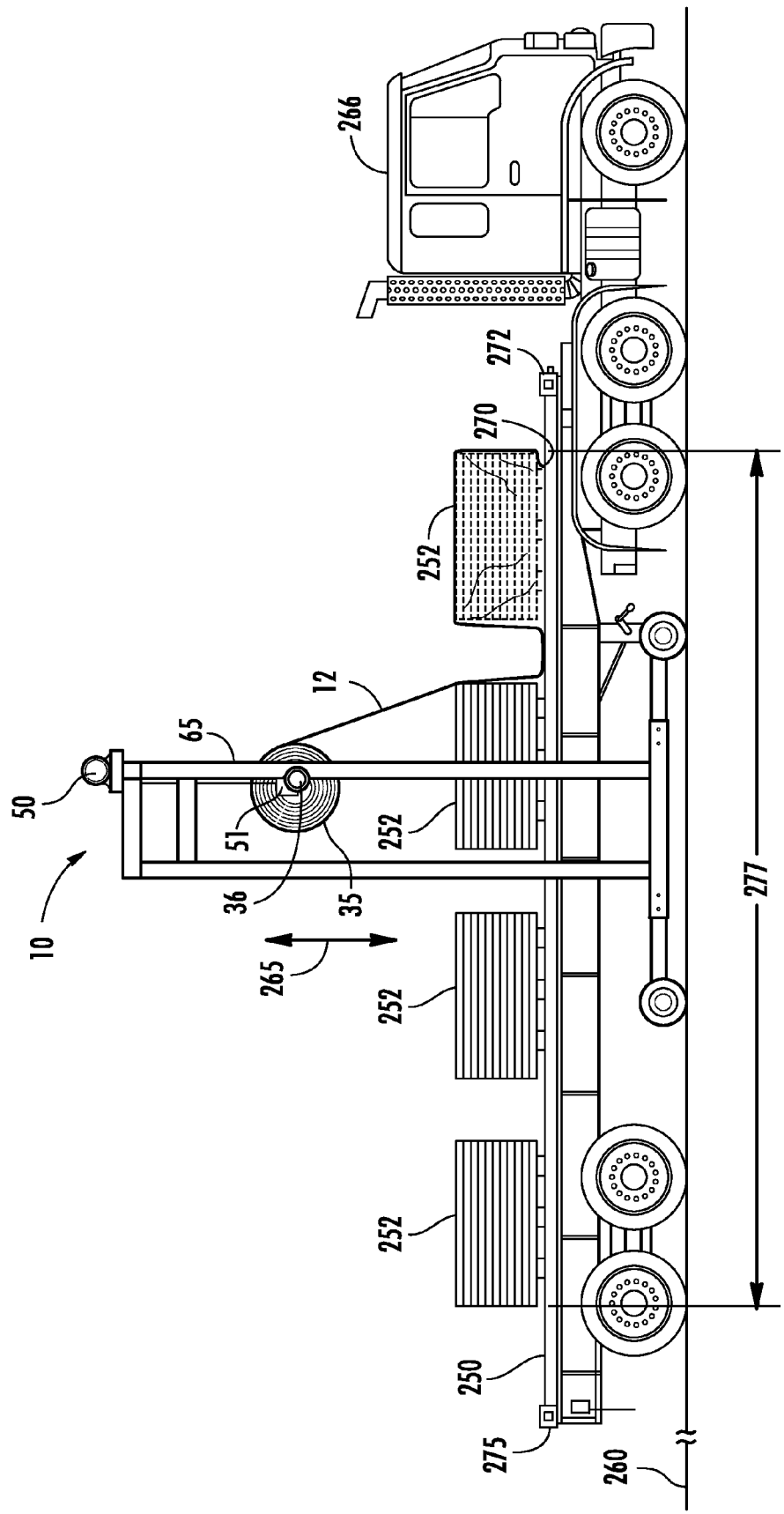

APPARATUS AND METHOD FOR APPLYING A TARP TO TRUCKING CARGO

BRIEF DESCRIPTION OF DRAWINGS

FIGS. 5a-5b are perspective and side views of the hub spool assembly of FIG. 1.

FIG. 6a-6c are exploded, front perspective and back perspective views of a guide roller assembly of FIG. 1.

FIG. 8 is side view of the tarping apparatus of FIG. 1 in a starting position.

DETAILED DESCRIPTION

Figure 1:
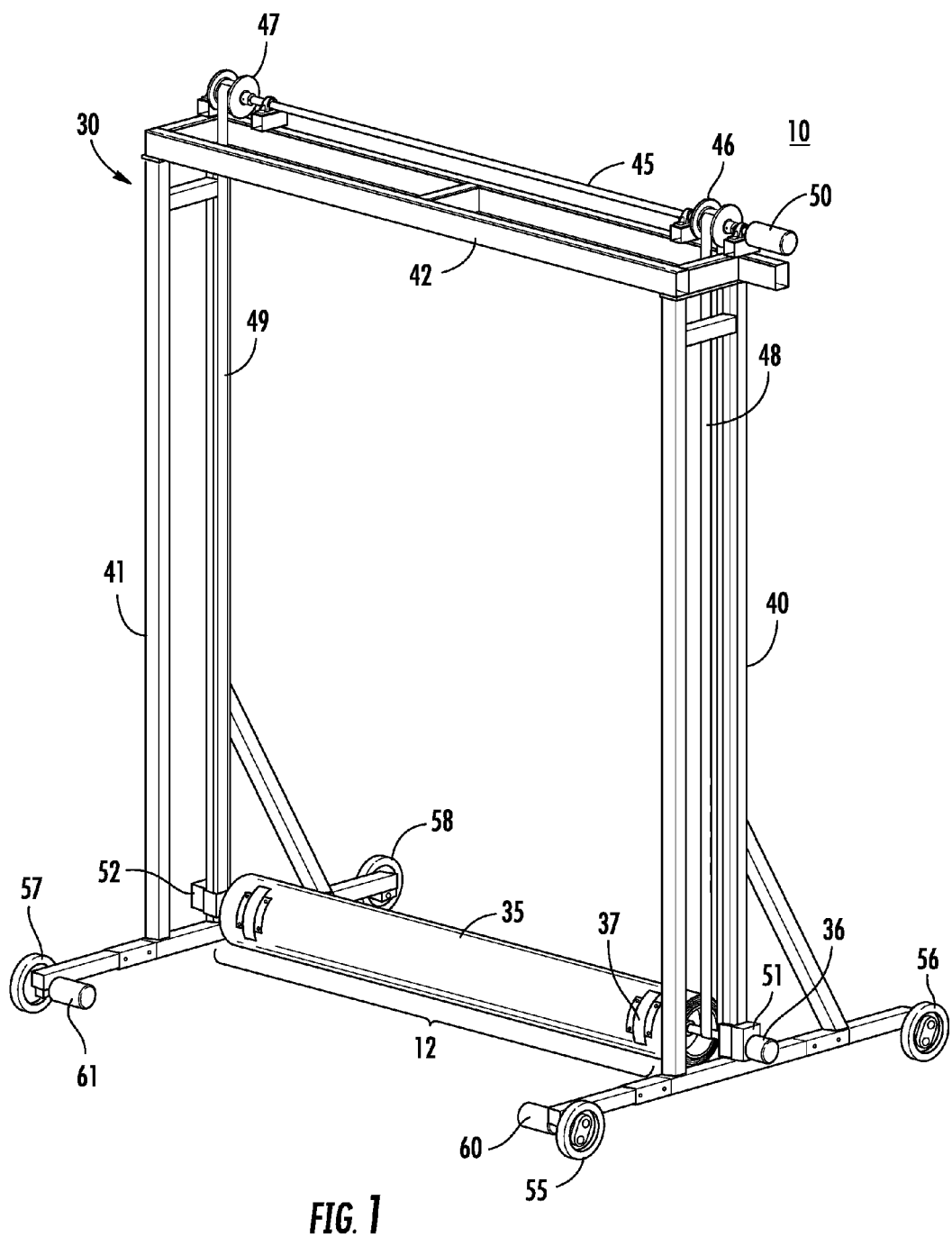
FIG. 1 is a front perspective view of an apparatus for applying a tarp to trucking cargo.

A truck tarping apparatus 10 is shown in FIG. 1. Tarping apparatus 10 allows a tarping material 12 to be easily applied onto a trucking cargo. This can be done without requiring a person climb onto a trailer carrying the trucking cargo or on top of the trucking cargo to apply the tarping material 12 thereto. Tarping material 12 or other protective member protects the trucking cargo during transport. The term trucking cargo used through out the description refers to any load that is being transported by a heavy vehicle. Reference will now be made in detail to the embodiments of the tarping apparatus 10, examples of which are illustrated in the drawings.

Figure 2:
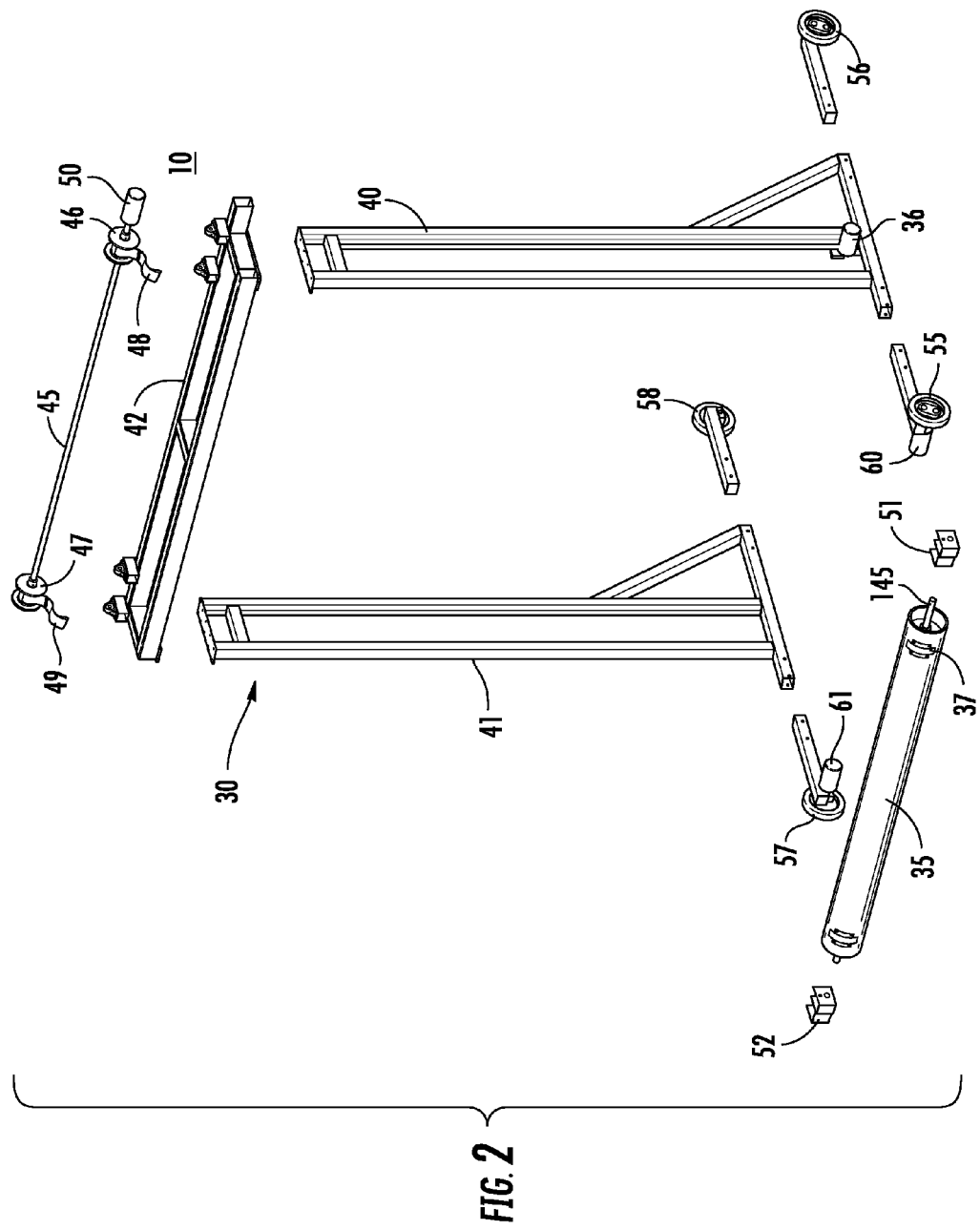
FIG. 2 is an exploded perspective view of the apparatus of FIG. 1.

As illustrated in FIGS. 1 and 2, which illustrate tarping apparatus 10 in assembled and exploded configurations, tarping apparatus 10 includes a frame assembly 30 and a drum roll 35, which is adapted to be lifted vertically along frame assembly 30. Drum roll 35 is operatively connected to a winding motor 36, which may be a bidirectional motor for causing rotation of drum roll 35 for winding and unwinding tarping material 12. In one embodiment, drum roll 35 includes retaining members, one of which is indicated at 37 for holding tarping material 12 in position during winding. In addition, frame assembly 30 is composed of a first side frame member 40 and a second side frame member 41. First side frame member 40 and second side frame member 41 are spaced apart and a cross frame member 42 extends therebetween. A rod 45 including first and second spool hub assemblies 46, 47, is operably attached to cross frame assembly 42. Straps 48 and 49 are attached to rod 45 at a first end and to a rod 145 that extends through drum roll 35 at a second end. A vertical drive motor 50 is operatively coupled to rod 45 to rotate rod 45 and cause straps 48 and 49 to wind around first and second spool hub assemblies 46 and 47, thereby lifting drum roll 35. Drum roll 35 engages right and left guide rollers 51 and 52, which cooperate with first and second side frames 40 and 41 to guide drum roll 35 as it is raised and lowered.

Frame assembly 30 also includes wheels 55-58 for allowing frame assembly 30 to be moved along the ground. One or more of wheels 55-58 may be coupled to a horizontal driving motor, as indicated at 60 and 61. Horizontal driving motors 60 and 61 allow frame assembly 30 to automatically be moved relative to a truck bed carrying trucking cargo. Each component of trucking apparatus 10 will be described in more detail below with reference to FIGS. 3a-6c.

Figure 3A:
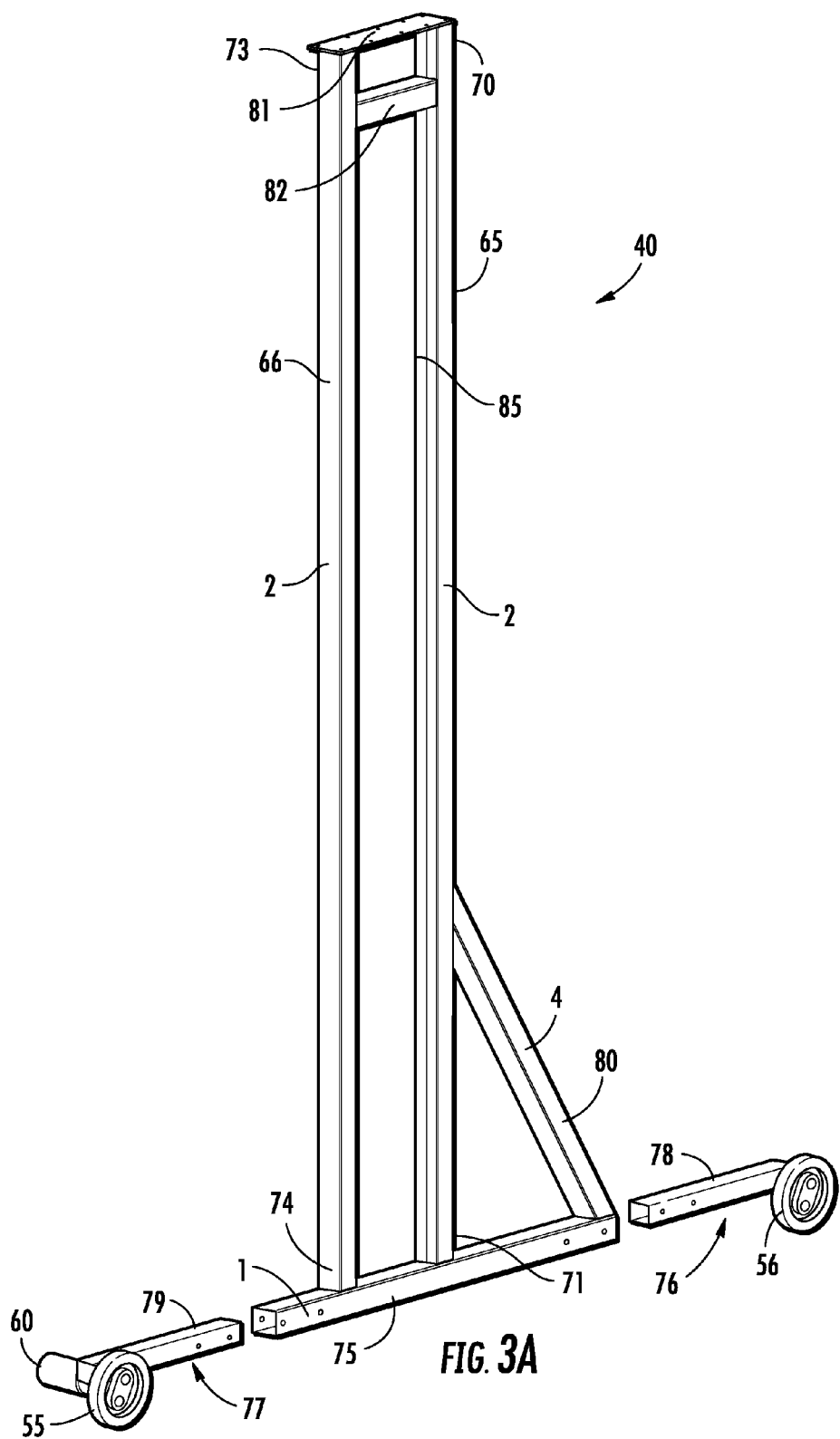
FIGS. 3a-3c are perspective, top and top detail views of a side frame of the apparatus of FIG. 1.
Figure 3B:
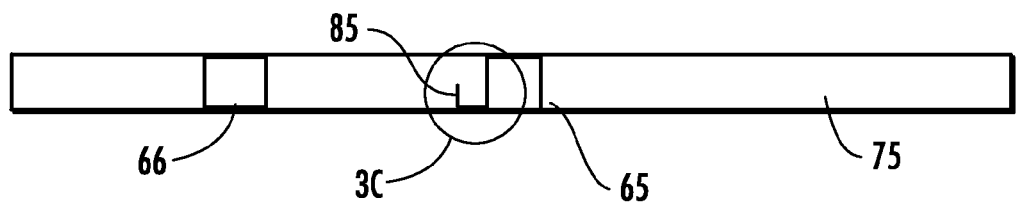
Figure 3C:
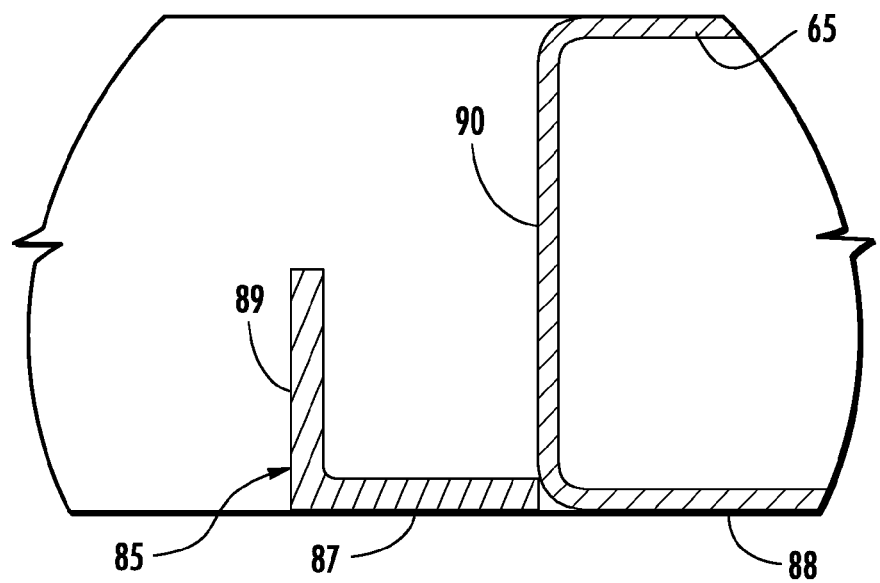

FIG. 3a is a side perspective view of first side frame member 40. It should be understood that second side frame member 41 includes corresponding components; however, for the sake of simplicity only first side frame member 40 will be described in detail. First side frame member 40 includes first and second upright supports 65 and 66. First upright support 65 includes a top end 70 and a bottom end 71. Second upright support 66 includes top end 73 and bottom end 74. Upright supports 65 and 66 are fastened to a base tube 75 at bottom ends 71 and 74, respectively. In the embodiment illustrated in FIG. 3a, base tube 75 is hollow with a square cross section for receiving outrigger assemblies, 76 and 77. Outrigger assemblies 76 and 77 include extension tubes 78 and 79, which are fastened to wheels 55 and 56. A gusset tube 80 is positioned diagonally between base tube 75 and first upright support 65 to provide further support for side frame member 40. In addition a tie plate 81 is fastened to top ends 70 and 73 of first and second upright supports 65 and 66. Although not illustrated, tie plate 81 may extend approximately 1 inch beyond upright supports 65 and 66 in all directions to provide support for cross frame member 42 (discussed below). A cross tube 82 is also provided between first and second upright supports 65 and 66. In one embodiment, cross tube 82 is positioned approximately 8 inches below tie plate 80. A retaining angle 85 is positioned adjacent to first upright support 65. As illustrated in cross-sectional view 3b and enlarged view 3c, retaining angle 85 includes a first wall 87, which is flush with a side edge 88 of first upright support 65, and second wall 89, which is spaced apart from and parallel to a second edge 90 of first upright support 65. Retaining angle 85 engages guide roller assembly 51 to assist in guiding drum roll 35 as it is vertically raised and lowered.

Figure 4A:
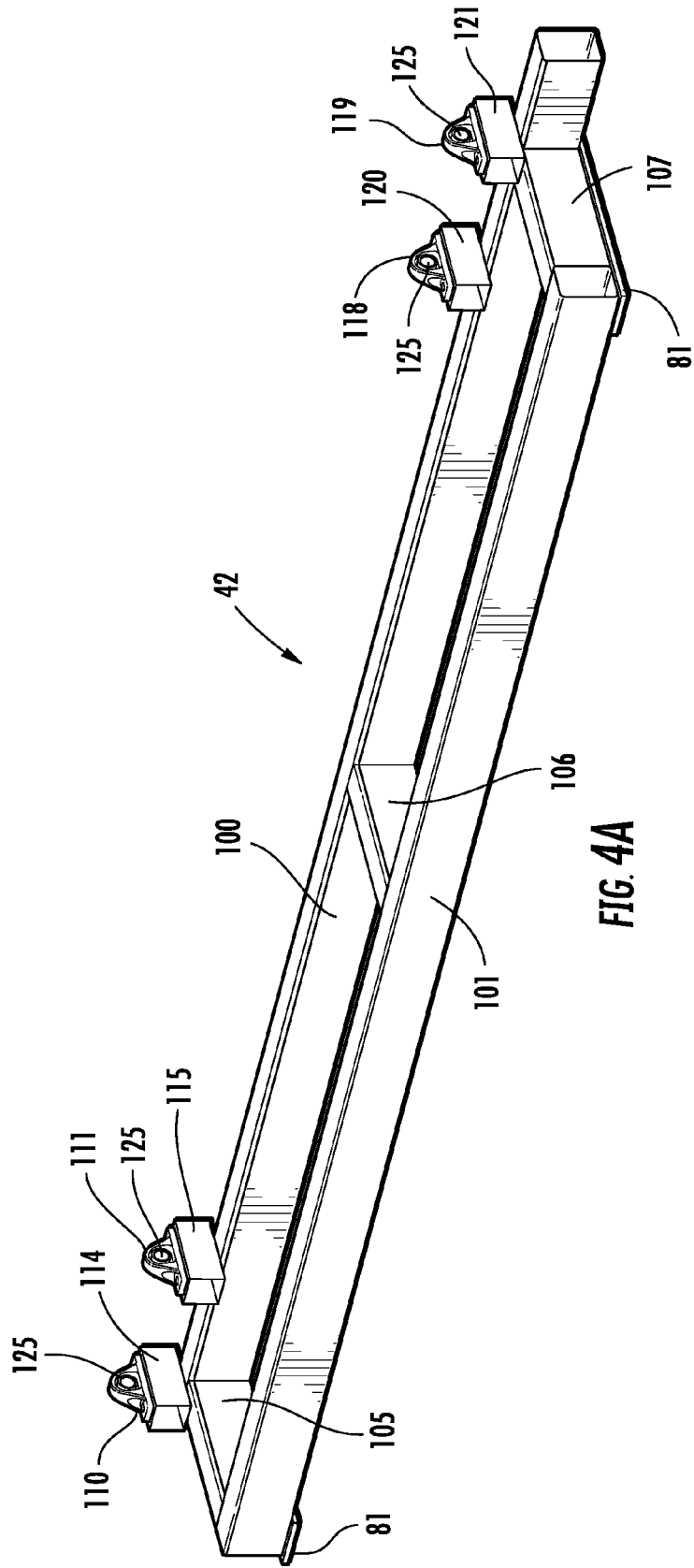
FIGS. 4a and 4b are perspective and side views of a cross frame assembly of the apparatus of FIG. 1.
Figure 4B:
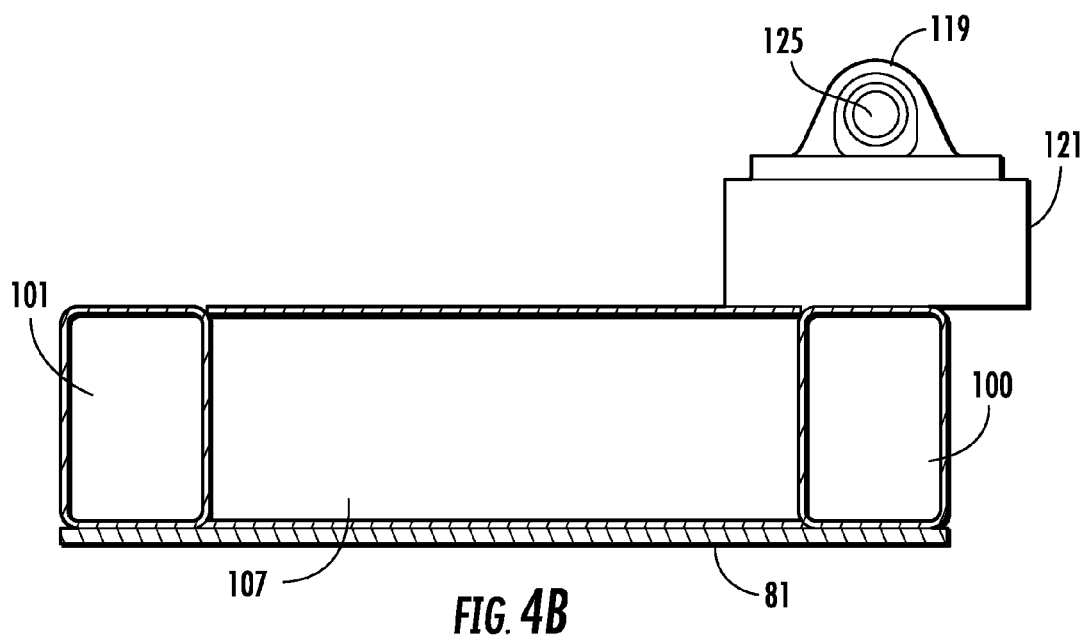
Figure 6C:
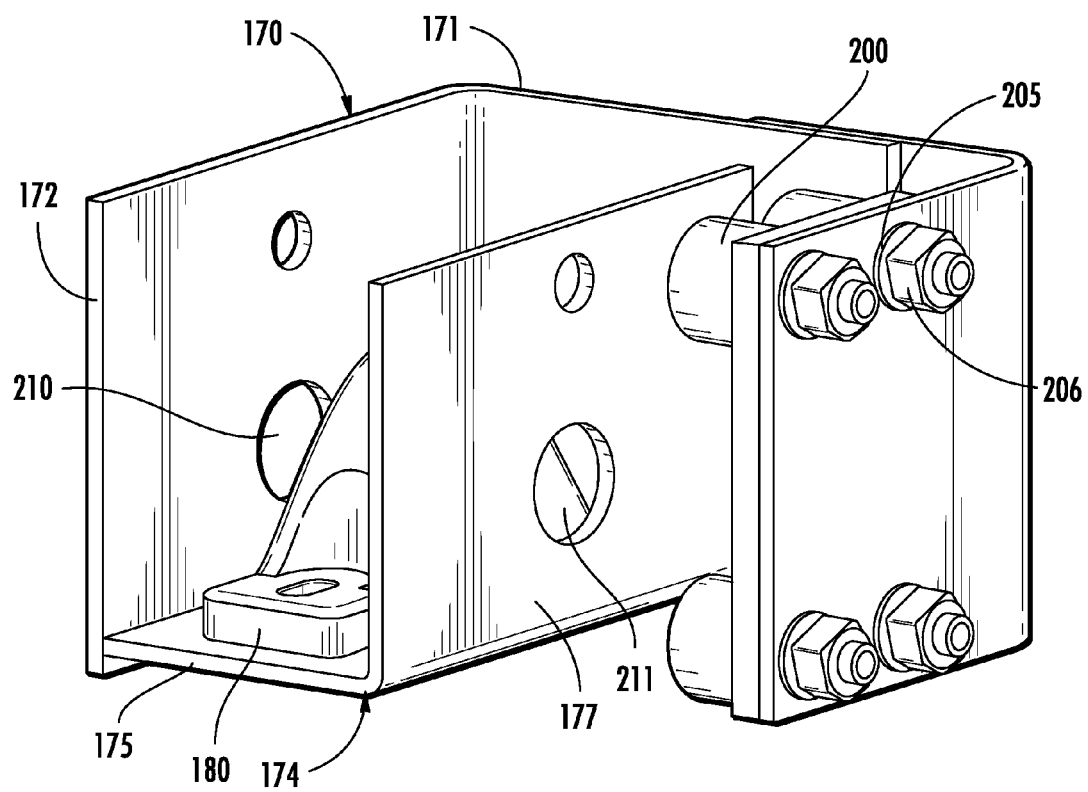

As illustrated in FIGS. 4a-4b, tarping apparatus 10 further includes a cross frame member 42, which is connected to first and second side frames 40 and 41 via tie plates 81. Cross frame assembly 42 includes front and rear bridge tubes 100 and 101, which are spaced apart by cross tubes 105-107. Cross frame assembly 42 also includes first and second bearings 110 and 111 mounted to rear bridge tube 100 by first and second bearing mount tubes 114 and 115. At an opposite end of rear bridge tube 100, third and fourth bearings 118 and 119 are mounted via third and fourth bearing mount tubes 120, 121. As shown in enlarged side view 4a, bearing 119 includes an aperture 125 therein for receiving rod 45. Each of bearings 110, 111 and 118, 119 also includes a corresponding aperture 125 for receiving and maintaining the positioning of rod 45.

Referring back to FIGS. 1 and 2, rod 45 also includes first and second spool hub assemblies 46, 47. One spool hub assembly 46 will now be described in detail with reference to FIGS. 5a and 5b. It should be understood that second spool hub assembly 47 includes identical components. Spool hub assembly 46 includes first and second end caps 130, 131 which are fastened to a barrel tube 135 by welding or the like. A shaft lock 136 is welded to each of first and second end caps 130, 131 for locking spool hub assembly 48 onto rod 45. Barrel tube 135 has a slot 138 formed therein through which strap 48 is inserted. Strap 48 is held in place by a clamp 150 and pair of socket screws 155. An opening 160 such that rod 45 may be inserted therein, as shown in FIGS. 1 and 2, is also provided in spool hub assembly 46. Strap 48 includes a loop 165 formed in a distal end thereof for engaging and lifting drum roll 35, as will be described in detail below.

Tarping apparatus 10 also includes right and left guide rollers 51 and 52, which cooperate with right and left frames 40 and 41 to guide roll assembly 35 as it is raised and lowered.

Right guide roller 51 will now be described in detail with reference to FIGS. 6a and 6b. It should be understood that left guide roller 52 includes corresponding components. Guide roller 51 includes a side plate 170 having a first edge 171 and a second edge 172 formed at a right angle to each other and a bearing mounting plate 174 having a bottom edge 175 and an upward extending edge 177. Side plate 170 and bearing mounting plate 174 are fastened together as illustrated in FIG. 6b. A bearing 180 is fastened to bottom edge 175 of bearing mounting plate 174. A track roller mounting plate 185, having a side edge 187 and a back edge 188 is also fastened to first edge 171 of side plate 170 via fasteners such as screws (not shown). A slide shoe plate 190 is fastened to side edge 187 of track roller mounting plate 185. Each of slide shoe plate 190 and side edge 187 of track roller mounting plate 185 include four apertures 195 formed therein for receiving four corresponding track rollers, one of which is indicated at 200. Each track roller 200 is held in place by a lock washer 205 and hex nut 206. Each bearing 180 has an aperture 208 formed therein for receiving rod 145, which extends through drum roll 35. Rod 145 also extends through openings 210 and 211 of side plate 170 and bearing mounting plate 174. Guide rollers 51 and 52 act to guide drum roll 35 vertically along side frame members 40 and 41 by engaging retaining angle 85 of upright support 65 of each side frame member 40 and 41.

Figure 7A:
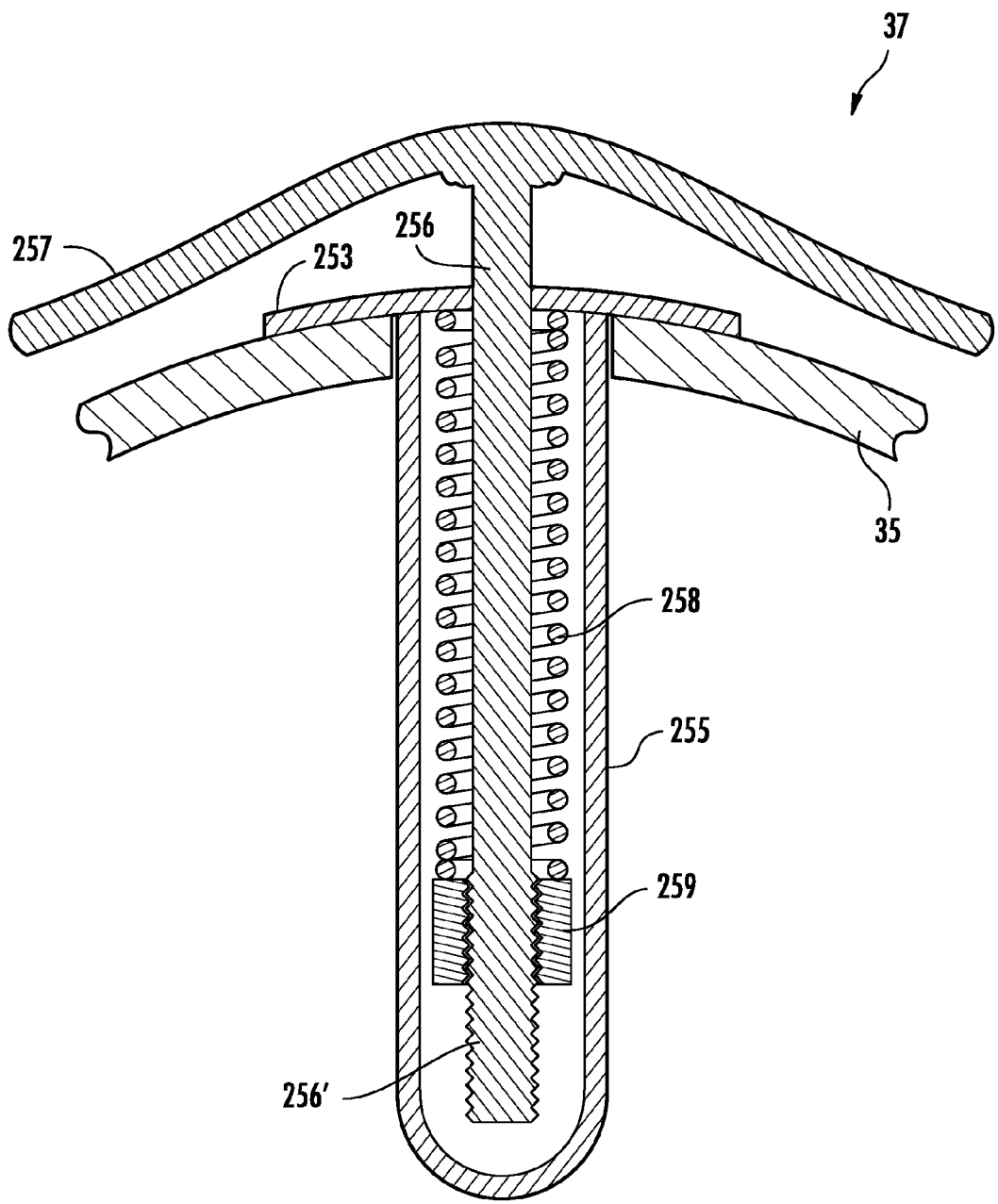
FIG. 7a is a cross sectional view of a tarp retainer.
Figure 7B:
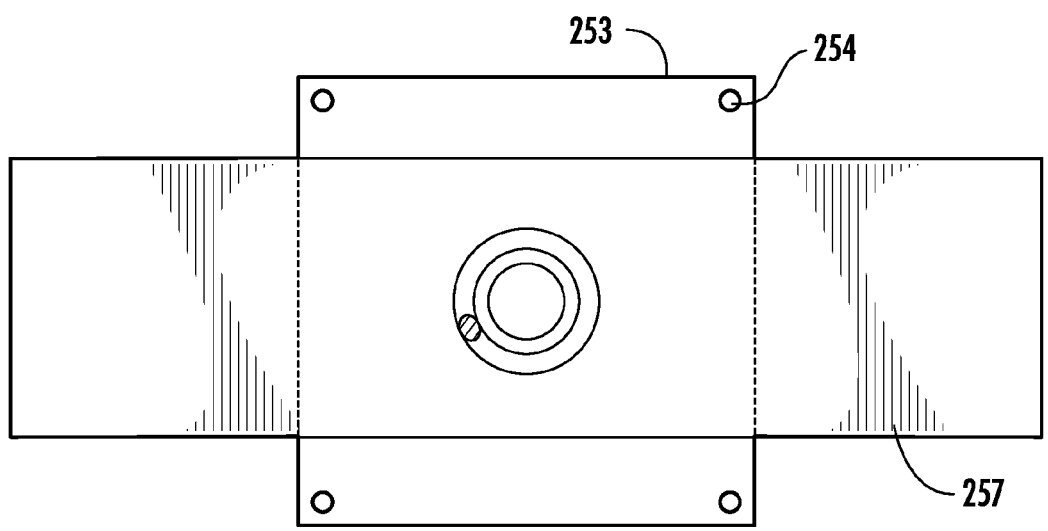
FIG. 7b is a top view of the tarp retainer.
Figure 9:
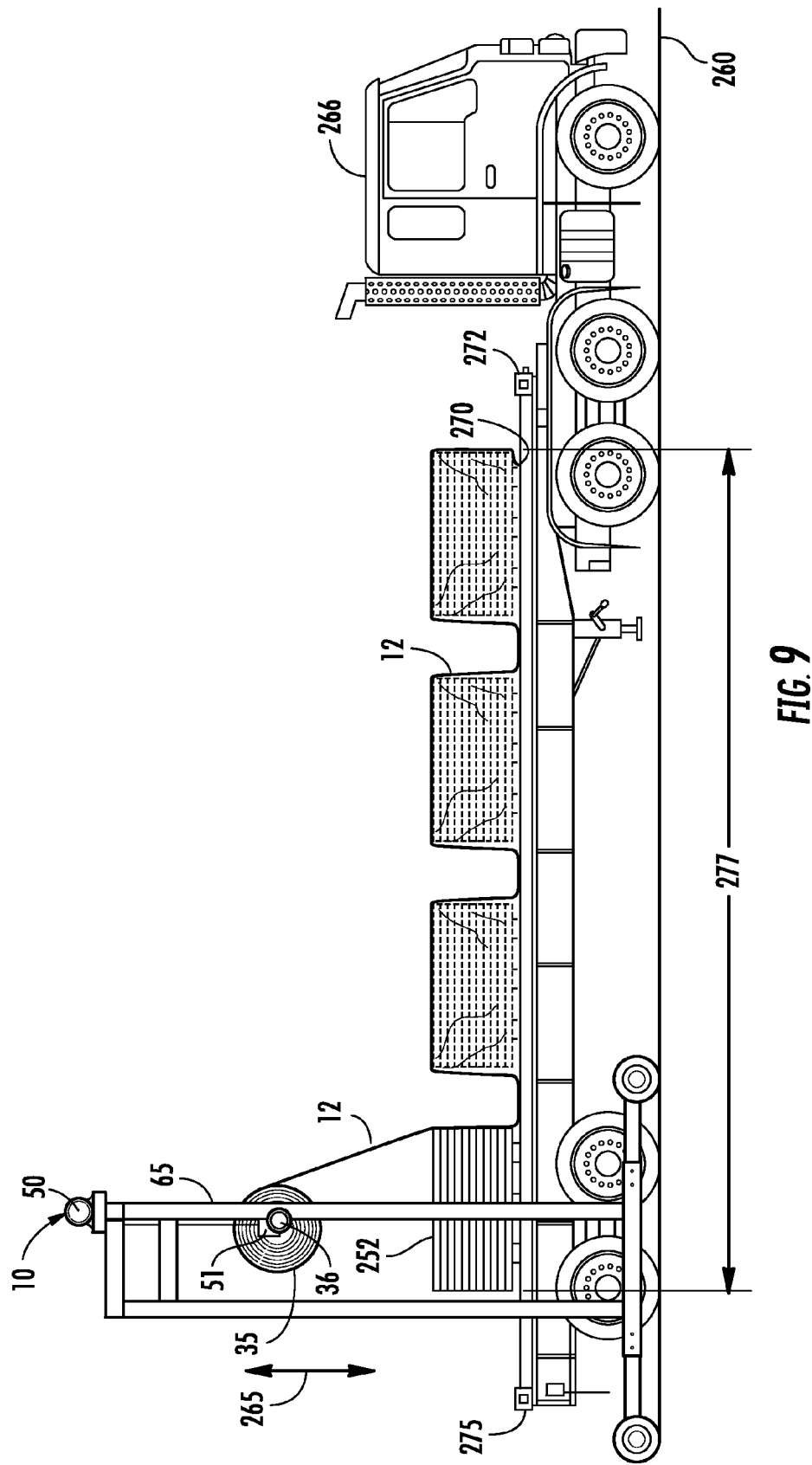
FIG. 9 is a side view of the tarping apparatus of FIG. 1 after a tarping material has been applied to a load.

The method by which the tarping apparatus 10 is used to apply a tarping material 12 to a truck bed 250 will now be described in detail with reference to FIGS. 7 and 8. Prior to being applied to the trucking cargo 252, tarping material 12 must be formed into a continuous roll by being folded towards its center, once or a number of times. In one embodiment tarping material 12 is 20 feet wide. It may be folded 4 times towards its center to make it 5 feet wide. However, it is to be understood that tarping material 12 can be of a different size and folded any number of times as contemplated. Tarping apparatus 10 provides for a simplified means for loading the folded tarp onto the tarping apparatus. Tarping layer 12 is loaded onto roll 35 when in a bottom position as shown in FIG. 1. In one embodiment, roll 35 includes tarp retaining members 37 for holding tarping material 12 in position while it is wound onto roll 35. As illustrated in FIGS. 7a and 7b, tarp retaining member 37 is inserted into an opening of drum 35 and includes a plate 253 fastened to drum 35. Plate 253 may be welded to drum 35 or fastened by screws or other fasteners through openings 254. A chamber-like extension 255 extends from plate 253 into drum roll 35. Plate 253 includes an aperture for receiving holding piece 256, which has a T-shape with threading 256' at one end, which extends into chamber-like extension 255 and outwardly extending flanges 257 at a second end, which are adapted to engage tarping material 12 and an outer portion of drum roll 35. A spiral spring 258 surrounds holding piece 256 where the holding piece 256 extends into chamber-like extension 255. Treading 256' is engaged by a nut 259 located in chamber-like extension 255 for holding outwardly extending flanges 257 biased against drum 35 so that tarp retaining member 37 is capable of holding tarping material 12 in place while drum 35 is wound. A user may roll tarping material 12 manually around drum roll 35 or tarping material 12 may be automatically wound onto drum roll 35 my any means known in the art. After a desired length of the tarping material 12 is dispensed from drum roll 35, the tarping material 12 may be cut at a desired position by means of a cutting mechanism (not shown). The cutting mechanism may employ any suitable means capable of cutting the tarping material 12. However, it is to be understood that in alternate embodiments the tarping material 12 may have perforations (not shown) defined at predetermined lengths to facilitate easy tearing or cutting of the tarping material 12 without the need for a cutting mechanism.

Once tarping layer 12 is wound onto roll, drum roll 35 may be lifted to a position above the height of trucking cargo 252 to be covered. Drum roll 35 is configured to be moved vertically with respect to the ground 260 such that drum roll 35 and tarping material 12 can move closer to and farther from the ground 260. The vertical bidirectional movement of drum roll 35 in the vertical direction 265 is achieved by the use of vertical driving motor 50. As described with reference to FIGS. 5a and 5b, a pair of straps 48, 49 are attached to spool hub assemblies 46 and 47. Rod 45, which engages spool hub assemblies 46 and 47, is connected to vertical driving motor 50. Vertical driving motor 50 causes rotation of rod 45 and spool hub assemblies 46 and 47. Thus, straps 148 and 49 are wound around spool hub assemblies 46 and 47. Each strap 148, 149 includes a loop 165 through which rod 145 extends. As vertical motor 50 rotates rod 45, the pair of straps 48, 49 wind around spool hub assemblies 46 and 47 and hence drum roll 35 is elevated. Rotating spool hub assemblies 46 and 47 in the opposite direction causes straps 48, 49 to unwind therefrom and thus lowering drum roll 35.

In addition, tarping assembly 10 is configured to move horizontally with respect to truck bed 250 and trucking cargo 252. As illustrated in FIGS. 1 and 2, horizontal driving motors 60 and 61 are employed to achieve the horizontal movement of tarping apparatus 10. With reference to FIG. 3A, each base tube 75 of each side frame 65 and 66 is adapted to attach to a pair of outrigger assemblies 76 and 77. Each out rigger assembly 76 and 77 includes an extension tube 78, 79 with a wheel 55, 56 fastened thereto. As shown in FIGS. 1 and 2, tarping apparatus includes four outrigger assemblies. A horizontal driving motor 60, 61 may be operably connected to one or more of the outrigger assemblies for causing horizontal movement thereof. In the embodiment shown, two horizontal driving motors 60 and 61 are provided. Thus, tarping apparatus 10 may be automatically moved horizontally along a truck bed 250 while a tarp is applied to the trucking cargo 252.

With reference to FIG. 7, tarping assembly 10, which has been preloaded with tarping material 12, is automatically wheeled via horizontal driving motors 60 and 61 to a position adjacent to a cab 266 of a truck bed 250 loaded with trucking cargo 252. Drum roll 35 carrying tarping material 12 is supported in a raised position by tarping apparatus 10. As the vertical driving motor 50 is energized, drum roll 35 is lowered to allow an operator to reach tarping material 12. As illustrated in FIG. 7, drum roll 35 is lowered to a level which allows the operator to be able to pull a leading edge 270 of the tarping material 12 and secure it to truck bed 250. The leading edge 270 can be secured at a position proximate to a front 272 of truck bed 250. The operator may be personnel or any automated mechanism configured to secure leading edge 270 proximate to the front 272 of truck bed 250.

The leading edge 270 may be secured to truck bed 250 by various means. For example, the tarping material 12 can be tied at the sides of truck bed 250. Additionally or alternatively, adhesives may be used to effect such an attachment. The tarping material 12 can be wide enough to accommodate the entire width of the trucking cargo 252. As soon as the operator pulls the leading edge 270 of the tarping material 12, rod 145 is rotated by winding motor 36 (seen in FIG. 1), causing the tarping material 12 to be dispensed from drum roll 35.

After the leading edge 270 of the tarping material 12 is secured to truck bed 250, horizontal driving motors 60 and 61 are again activated. Activation of horizontal driving motors 60 and 61 result in the movement of tarping apparatus 10, thus drum roll 35, in a horizontal plane parallel to the ground 260 along the length of truck bed 250. Tarping apparatus 10 moves from a position proximate to the front 272 towards the back 275 of truck bed 250. Also, drum roll 35 is raised to a sufficient height by vertical driving motor 50 to ensure that the horizontal movement of tarping apparatus 10 is not hindered by trucking cargo 252.

While tarping apparatus 10 moves in a horizontal plane, the tarping material 12 is unfolded from drum roll 35 so that the trucking cargo 252 positioned underneath may be draped with the tarping material 12. Referring to FIG. 8, the dispensed length of the tarping material 12 is sufficient to drape the entire length 277 of the trucking cargo 252. However, it is to be understood that other arrangements are possible in which tarping material 12 is not positioned over the entire length 277 of trucking cargo 252. Thereafter, the tarping material 12 is cut at a desired position, by the use of a cutting mechanism (not shown).

The motors 36, 50 and 60, 61 may be gear motors of 1 HP. Motors of various types and powers may be used in other embodiments depending upon the weight and requirement of the tarping material 12. Alternatively, vertical driving motor 50 and horizontal driving motors 60 and 61 may be operated by an electric drive system, a hydraulic drive system, a pneumatic drive system or any other type of drive system.

As discussed above, drum roll 35 may be attached to a winding motor 36 so that it can rotate in order to dispense the tarping material 12. Alternatively, drum roll 35 need not arranged so that it is automatically driven. Instead, drum roll 35 can rotate freely on rod 145 or another mechanism due to forces being applied to tarping material 12. In this regard, tarping material 12 can be pulled from drum roll 35 without automatically rotating rod 145. Other embodiments are possible in which the tarping material 12 is dispensed from drum roll 35 through both a combination of pulling of tarping material 12 and a rotation of drum roll 35.

The tarping material 12 may be made from of a variety of materials in accordance with certain exemplary embodiments. For example, the tarping material 12 may be made out of plastic in accordance with certain embodiments. The tarping material 12 can be placed on the trucking cargo 252 in order to provide protection during transport. The tarping material 12 may also be paced on the trucking cargo 252 in order to function as a moisture resistance layer. The tarping material 12 may made of a flexible material and may be waterproof in accordance with certain exemplary embodiments. A tarp, such as a canvas tarp, can be placed on top of the tarping material 12 to further protect the trucking cargo 252.

The tarping material 12 may be applied to the trucking cargo 252 in the longitudinal direction so as to cover the trucking cargo 252. As used herein, the term "longitudinal direction" refers to the direction from the front of the vehicle to the back of the vehicle or from the back of the vehicle to the front of the vehicle. The longitudinal direction may thus be from the front of the truck bed 250 to the back of the truck bed 250. The longitudinal direction may also extend from the back of the truck bed 250 to the front of the truck bed 250.

Various modifications to the above mentioned embodiments are possible. While the embodiments of the present invention have been described, it is to be understood that the claimed invention is not to be limited in scope to the aforementioned and described embodiments. For example the tarping apparatus may be used for applying tarping materials to dumpsters, materials stored on pallets or flatbeds, or dump trucks.

I claim:

1. An apparatus for applying a tarping material to a truck bed, comprising:
   a drum roll for winding tarping material thereon, said drum roll having a first end and a second end, wherein rotation of the drum roll facilitates the winding of the tarping material onto said drum roll;
   a frame assembly having first and second frame members positioned adjacent to said first and second ends of said drum roll, the first and second frame members each including a top end and a bottom end;
   a first spool hub assembly rotatably connected to the top end of the first frame member and a second spool hub assembly rotatably connected to the top end of the second frame member;
   a first strap and a second strap each having a first end for engaging the drum roll and a second end for engaging one of the first and second spool hub assemblies, wherein rotation of the first and second spool hub assemblies causes the first and second straps to wind or unwind around the first and second spool hub assemblies, such that the drum roll is configured for vertical movement along said first and second frame members with respect to the ground such that the drum roll is capable of being moved closer to and farther from the ground; and
   a wheel assembly attached to said frame for facilitating movement of said frame and drum roll along the truck bed such that tarping material may be unwound from said drum roll as said frame moves along a length of said truck bed.

2. The apparatus as set forth in claim 1, further comprising a vertical drive motor for facilitating said vertical movement of said drum roll.

3. The apparatus as set forth in claim 1, further comprising a winding motor for causing rotation of the drum roll for winding or unwinding said tarping material.

4. The apparatus as set forth in claim 1, further comprising a horizontal driving motor coupled to said wheel assembly for facilitating movement of said frame and drum roll along the truck bed.

5. The apparatus as set forth in claim 4, further comprising a second horizontal driving motor coupled to said wheel assembly for facilitating movement of said frame and drum roll along the truck bed.

6. The apparatus as set forth in claim 1, wherein said frame is a free standing structure.

7. The apparatus as set forth in claim 1, wherein said drum roll is coupled to first and second guide rollers for guiding said drum roll along saidfirst and second frame members as drum roll is moved vertically.

8. An apparatus for applying tarping material a truck bed, comprising:
   a drum roll for winding tarping material thereon, said drum roll having a first end and a second, end, wherein rotation of the drum roll facilitates the winding of the tarping material onto said drum roll;
   a winding motor for causing rotation of the drum roll for winding or unwinding said tarping material;
   a frame assembly having first and second frame members positioned adjacent to said first and second ends of said drum roll, the first and second frame members each including a top end and a bottom end;
   a first spool hub assembly rotatably connected to the top end of the first frame member and a second spool hub assembly rotatably connected to the top end of the second frame member;
   a first strap and a second strap each having a first end for engaging the drum roll and a second end for engaging one of the first and second spool hub assemblies, wherein rotation of the first and second spool hub assemblies causes the first and second straps to wind or unwind around the first and second spool hub assemblies, such that the drum roil is configured for vertical movement along said first and second frame members with respect to the ground such that the drum roll is capable of being moved closer to and farther from the ground;

a vertical drive motor for facilitating said vertical movement of said drum roll;

a wheel assembly attached to said frame for facilitating movement of said frame and drum roll along the truck bed such that tarping material may be unwound from said drum roll as said frame moves along a length of said truck bed; and a horizontal driving motor coupled to said wheel assembly for facilitating movement of said frame and drum roll along the truck bed.

9. The apparatus as set forth in claim 8, further comprising a second horizontal driving motor coupled to said wheel assembly for facilitating movement of said frame and drum roll along the truck bed.

10. The apparatus as set forth in claim 8, wherein said frame is a free standing structure.

11. The apparatus as set forth in claim 8, wherein said drum roll is coupled to first and second guide rollers for guiding said drum roll along said first and second frame members as drum roll is moved vertically.

12. The apparatus as set forth in claim 8, further comprising a rod disposed through a center of the drum roll, wherein the rod is capable of being rotationally driven through actuation of said winding motor so as to facilitate winding and dispensing of the tarping material.

13. A method of applying a tarping material to trucking cargo, comprising the steps of:

winding a tarping material onto a drum roll by activation a winding motor operatively coupled to said drum roll;

lifting said drum roll vertically along a frame by activating, a vertical drive motor;

said frame being coupled to said drum roll by first and second spool hub assemblies rotatably connected to a top end of the frame and first and second straps each having a first end for engaging the drum roll and a second for engaging one of first and second spool hub assemblies, wherein rotation of the first an second spool hub assemblies causes the first and second straps to wind or unwind around the first and second spool hub assemblies;

positioning said frame and said drum roll adjacent to said trucking cargo by activating a horizontal driving motor in a first direction;

securing a leading edge of said tarping material;

moving said frame and drum roll by activating said horizontal driving motor in a second direction, wherein said step of moving said frame and drum roll causes the tarping material to be dispensed from the drum roll such that the tarping material is applied to the trucking cargo in a longitudinal direction of the trucking cargo so as to cover the trucking cargo;

detaching the tarping material from the roll of tarping material; and securing a trailing edge of the tarping material.

14. The method of applying a tarping material as set forth in claim 13, wherein the trucking cargo is carried by a trailer, and wherein the leading edge of the tarping material is secured closer to a front of the trailer than the trailing edge of the tarping material.

15. The method of applying a tarping material as set forth in claim 13, further comprising the step of lowering the drum roll prior to the step of securing the leading edge of the tarping material.

16. The method of applying a tarping material as set forth in claim 13, wherein the step of dispensing the tarping material includes activating said winding motor in a second direction to unwind the tarping material.

17. The method of applying a tarping material as set forth in claim 13, wherein the step of detaching the tarping material is accomplished through use of an element selected from the group consisting of a utility knife, peribrations defined in the tarping material, and an automatic cutting mechanism.

* * * * *